(12) United States Patent
Kim et al.

(10) Patent No.: US 10,683,383 B2
(45) Date of Patent: Jun. 16, 2020

(54) METHOD OF PREPARING POLYUREA RESIN COMPOSITION, POLYUREA RESIN COMPOSITION PREPARED THEREBY, AND INDUSTRIAL GLOVE COATED WITH POLYUREA RESIN COMPOSITION

(71) Applicants: TOUCH GREEN CO., LTD., Chungcheongbuk-do (KR); Young Woo Kim, Seoul (KR)

(72) Inventors: Young Woo Kim, Seoul (KR); Jong Jin Hong, Gyeongsangnam-do (KR); Seong Ho Yeom, Jeollanam-do (KR)

(73) Assignees: TOUCH GREEN CO., LTD., Chungcheongbuk-do (KR); Young Woo Kim, Seoul (KR)

( * ) Notice: Subject to any disclaimer, the term of this patent is extended or adjusted under 35 U.S.C. 154(b) by 26 days.

(21) Appl. No.: 16/139,859

(22) Filed: Sep. 24, 2018

(65) Prior Publication Data

US 2020/0095364 A1  Mar. 26, 2020

(30) Foreign Application Priority Data

Sep. 20, 2018  (KR) .......................... 10-2018-0113018

(51) Int. Cl.

| | | |
|---|---|---|
| *C08G 18/10* | (2006.01) | |
| *A41D 19/00* | (2006.01) | |
| *C08G 18/75* | (2006.01) | |
| *C08G 18/76* | (2006.01) | |
| *C08L 75/02* | (2006.01) | |
| *C08G 18/20* | (2006.01) | |
| *C08G 18/08* | (2006.01) | |
| *C08K 5/09* | (2006.01) | |
| *C08G 18/50* | (2006.01) | |

(52) U.S. Cl.
CPC ......... *C08G 18/10* (2013.01); *A41D 19/0055* (2013.01); *C08G 18/0866* (2013.01); *C08G 18/2027* (2013.01); *C08G 18/5024* (2013.01); *C08G 18/755* (2013.01); *C08G 18/7671* (2013.01); *C08K 5/09* (2013.01); *C08L 75/02* (2013.01)

(58) Field of Classification Search
CPC ....... C09D 175/00; C08G 18/06; C08L 75/12; A41D 19/00
See application file for complete search history.

(56) References Cited

U.S. PATENT DOCUMENTS

2006/0058453 A1* 3/2006 Argyropoulos ........ C08G 18/12
524/589

FOREIGN PATENT DOCUMENTS

| KR | 1998-0066935 A | 10/1998 |
|---|---|---|
| KR | 10-1531553 B1 | 6/2015 |
| KR | 10-1538334 B1 | 7/2015 |
| KR | 10-2018-0003062 A | 1/2018 |
| KR | 10-1832433 B1 | 2/2018 |
| KR | 10-2018-0089955 A | 8/2018 |

OTHER PUBLICATIONS

An Office Action issued by the Korean Patent Office dated Jul. 1, 2019, which corresponds to Korean Patent Application No. 10-2018-0113018 and is related to U.S. Appl. No. 16/139,859.

* cited by examiner

*Primary Examiner* — Kuo Liang Peng
(74) *Attorney, Agent, or Firm* — Studebaker & Brackett PC

(57) ABSTRACT

A method of preparing polyurea resin composition comprises forming a prepolymer by mixing about 50 parts by weight to about 80 parts by weight of a polyol, about 4 parts by weight to about 8 parts by weight of a dispersant, and about 20 parts by weight to about 30 parts by weight of a first monomer containing an isocyanate group; forming a first composition by mixing the prepolymer with about 2 parts by weight to about 4 parts by weight of a second monomer containing an amine group; stirring and emulsifying the first composition with about 100 parts by weight to about 200 parts by weight of a solvent; and forming a second composition by further adding about 0.2 part by weight to about 1.5 parts by weight of the second monomer to the emulsified first composition and stirring the resulting composition.

11 Claims, 7 Drawing Sheets

METHOD OF PREPARING POLYUREA RESIN COMPOSITION, POLYUREA RESIN COMPOSITION PREPARED THEREBY, AND INDUSTRIAL GLOVE COATED WITH POLYUREA RESIN COMPOSITION

PRIORITY CLAIM

This application claims the benefit of Korean Patent Application No. 10-2018-0113018, filed on Sep. 20, 2018, in the Korean Intellectual Property Office, the disclosure of which is incorporated herein by reference in its entirety.

BACKGROUND

Field of the Disclosure

The present disclosure relates to a method of preparing a polyurea resin composition, a polyurea resin composition prepared thereby, and an industrial glove coated with the polyurea resin composition. More particularly, the present disclosure relates to a method of preparing a polyurea resin composition, a part of which permeates into a target object and the remainder of which is capable of forming a coating film on an outer surface of the target object, a polyurea resin composition prepared thereby, and an industrial glove coated with the polyurea resin composition.

Description of the Related Art

Conventionally, there is a method of impregnating a target object with a resin having permeability as a method of forming a film including the resin on the target object. In this case, the resin only permeates into the target object so that a film is not formed. Thus, to prevent a resin composition from permeating into a target object, a method of performing water-repellent treatment on a surface of the target object and impregnating the treated target object with the resin composition has been used. In this regard, the water-repellent treatment of the surface of the target object is performed using an alcohol, potassium hydroxide, calcium chloride, calcium nitrate, or the like, and in the case of alcohols, there is a risk of fire, and other chemical products are harmful to the human body. In addition, after producing products, surfaces of which have been subjected to water-repellent treatment, the products are washed again to remove chemicals and dried, and in these processes, it is difficult to perform complete washing and a lot of costs are incurred.

Therefore, a resin capable of forming a coating film on a target object has been used, but in this case, the resin is not able to permeate into the target object and forms only a coating film, so that the target object and the resin are easily separated from each other.

SUMMARY

Aspects of the present disclosure provide a method of preparing a polyurea resin composition, a polyurea resin composition prepared thereby, and an industrial glove coated with the polyurea resin composition. A part of the polyurea resin composition may permeate into a target object, and another part thereof may form a coating film on a surface of the target object. Therefore, the present disclosure provides an industrial glove having excellent durability due to formation of the coating film and exhibiting enhanced adhesion due to permeation of the resin composition.

It should be noted that objects of the present disclosure are not limited to the above-described objects, and other objects of the present disclosure will be apparent to those skilled in the art from the following descriptions.

According to an exemplary embodiment of the present disclosure, a method of preparing a polyurea resin composition comprises forming a prepolymer by mixing about 50 parts by weight to about 80 parts by weight of a polyol, about 4 parts by weight to about 8 parts by weight of a dispersant, and about 20 parts by weight to about 30 parts by weight of a first monomer containing an isocyanate group; forming a first composition by mixing the prepolymer with about 2 parts by weight to about 4 parts by weight of a second monomer containing an amine group; stirring and emulsifying the first composition with about 100 parts by weight to about 200 parts by weight of a solvent; and forming a second composition by further adding about 0.2 part by weight to about 1.5 parts by weight of the second monomer to the emulsified first composition and stirring the resulting composition.

In an exemplary embodiment, the forming of the prepolymer comprises: a first mixing process of dissolving the polyol and the dispersant at a temperature ranging from about 80° C. to about 95° C.; mixing the dissolved polyol and dispersant with the first monomer and heating the resulting mixture to a temperature ranging from about 100° C. to about 120° C.; and a second mixing process of further adding the first monomer to the heated mixture and allowing the resulting mixture to react at a temperature ranging from about 80° C. to about 100° C.

In an exemplary embodiment, the dispersant comprises dimethylolpropionic acid (DMPA), the first monomer comprises methylene diphenyl diisocyanate (MDI) or isophorone diisocyanate (IPDI), and the second monomer comprises triethanolamine (TEA) or piperazine.

In an exemplary embodiment, the first monomer mixed in the heating comprises methylene diphenyl diisocyanate (MDI), and the first monomer mixed in the second mixing process comprises isophorone diisocyanate (IPDI).

In an exemplary embodiment, the second monomer mixed in the forming of the first composition comprises triethanolamine (TEA), and the second monomer mixed in the forming of the second composition comprises piperazine.

In an exemplary embodiment, in the emulsifying of the first composition, the solvent comprises water, and the first composition and the solvent are stirred at about 1,200 rpm to about 1,900 rpm for about 30 minutes to about 60 minutes.

In an exemplary embodiment, the forming of the first composition is performed at a temperature ranging from about 60° C. to about 80° C.

In an exemplary embodiment, the forming of the second composition comprises: mixing the emulsified first composition and the second monomer at a temperature ranging from about 20° C. to about 50° C.; and stirring the mixed first composition with about 100 parts by weight to about 300 parts by weight of a solvent at about 1,000 rpm to about 1,500 rpm.

In an exemplary embodiment, a method of preparing a polyurea resin composition further comprises emulsifying the second composition while being stirred at about 500 rpm to about 800 rpm.

According to an exemplary embodiment of the present disclosure, a polyurea resin composition prepared by the method of preparing a polyurea resin composition.

In an exemplary embodiment, the polyurea resin composition comprises: about 15 parts by weight to about 17.5 parts by weight of a polyol; about 0.5 part by weight to about 1.5 parts by weight of a dispersant; about 4.5 parts by weight to about 6.5 parts by weight of a first monomer; about 1 part by weight to about 2 parts by weight of a second monomer; and about 70 parts by weight to about 80 parts by weight of a solvent.

In an exemplary embodiment, the dispersant comprises dimethylolpropionic acid (DMPA), the first monomer comprises methylene diphenyl diisocyanate (MDI) or isophorone diisocyanate (IPDI), and the second monomer comprises triethanolamine (TEA) or piperazine.

According to an exemplary embodiment of the present disclosure, an industrial glove comprises: a glove; and a coating film layer disposed on the glove and comprising a polyurea resin composition prepared by the method of preparing a polyurea resin composition.

In an exemplary embodiment, the coating film layer comprises: an inner film layer formed such that at least a part of the polyurea resin composition partially permeates into an inner skin of the glove, but does not permeate into an inner surface of the glove; and a coating layer disposed on an outer surface of the glove, the coating layer being formed of the remainder of the polyurea resin composition.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

As used herein, the term "and/or" includes any and all combinations of one or more of the associated listed items. A numerical range expressed using "to" means a range including numerical values before and after "to" as a lower limit and an upper limit, respectively. The term "about" or "approximately" as used herein refers to a value or numerical range within 20% of the value or numerical range described after the term.

Hereinafter, embodiments of the present disclosure will be described with reference to the accompanying drawings.

Figure 1:
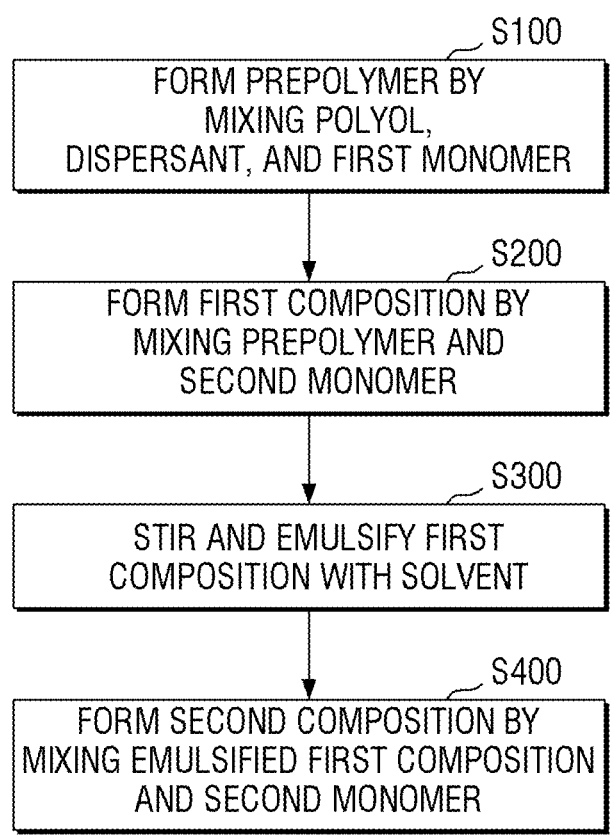
FIG. 1 is a flowchart illustrating a method of preparing a polyurea resin composition, according to an embodiment of the present disclosure.

FIG. 1 is a flowchart illustrating a method of preparing a polyurea resin composition, according to an embodiment of the present disclosure.

Referring to FIG. 1, the method of preparing a polyurea resin composition, according to an embodiment, may include: forming a prepolymer by mixing about 50 parts by weight to about 80 parts by weight of a polyol, about 4 parts by weight to about 8 parts by weight of a dispersant, and about 20 parts by weight to about 30 parts by weight of a first monomer containing an isocyanate group (operation S100); forming a first composition by mixing the prepolymer with about 2 parts by weight to about 4 parts by weight of a second monomer containing an amine group (operation S200); stirring and emulsifying the first composition with about 100 parts by weight to about 200 parts by weight of a solvent (operation S300); and forming a second composition by further adding about 0.2 part by weight to about 1.5 parts by weight of the second monomer to the emulsified first composition and stirring the resulting composition (operation S400).

First, in formation of the prepolymer (operation S100), the polyol may form a basic skeleton of the polyurea resin composition. A polyol contains hydroxyl groups in a molecule, and thus reacts with isocyanate groups, which will be described below, thereby forming a prepolymer. The type of a polyol is not particularly limited. As described below, in preparing a polyurea resin composition by polymerization with the second monomer, the polyol may be selected in consideration of molecular weight, other physical properties, or the like needed for a polyurea resin.

The dispersant may be added to the polyol to form a prepolymer, and may impart water solubility to the polyurea resin composition. In an exemplary embodiment, the dispersant may be dimethylolpropionic acid (DMPA), but the present disclosure is not limited thereto.

The polyurea resin composition includes a water-soluble dispersant, and thus may have water solubility, and the water-soluble dispersant may allow polyurea resin particles to be dispersed in the solvent. In this regard, as described below, properties of a coating film layer formed of the polyurea resin composition may be controlled by adjusting dispersibility, water solubility, or the like of the polyurea resin composition.

In a case in which a polyurea resin composition according to an embodiment forms a coating film layer on a target object, at least a part of the polyurea resin composition permeates into an inner skin of the target object so that an inner film layer is partially formed on the inner skin of the target object, and the remainder thereof may form a coating layer on an outer surface of the target object. Accordingly, the coating film layer formed of the polyurea resin composition may exhibit enhanced adhesion due to the inner film layer formed on the inner skin of the target object.

The first monomer may contain an isocyanate group. The isocyanate group may form a monomer in the polyurea resin composition by reacting with the polyol. In an exemplary embodiment, the first monomer containing an isocyanate group may be methylene diphenyl diisocyanate (MDI) or isophorone diisocyanate (IPDI), but the present disclosure is not limited thereto.

In addition, the first monomer containing an isocyanate group may be hydrophilic, and thus the formed prepolymer may have hydrophilicity due to the dispersant and the first monomer. As described above, the first monomer containing an isocyanate group may also impart water solubility to the polyurea resin composition, thereby enhancing permeability.

The prepolymer formed by mixing the polyol, the dispersant, and the first monomer containing an isocyanate group may be mixed with the second monomer containing an amine group to thereby form a polyurea resin composition, in a subsequent process. In some embodiments, the prepolymer may be formed by mixing about 50 parts by weight to about 80 parts by weight of a polyol, about 4 parts by weight to about 8 parts by weight of a dispersant, and about 20 parts by weight to about 30 parts by weight of a second monomer, and in other embodiments, the prepolymer may be formed by mixing 70 parts by weight of a polyol, 4 parts by weight of a dispersant, and 23 parts by weight of a first monomer. However, the present disclosure is not limited to the above examples.

Meanwhile, in an exemplary embodiment, the formation of the prepolymer may include: a first mixing process of dissolving the polyol and the dispersant at a temperature ranging from about 80° C. to about 95° C.; mixing the dissolved polyol and dispersant with the first monomer and heating the resulting mixture to a temperature ranging from about 100° C. to about 120° C.; and a second mixing process of further adding the first monomer to the heated mixture and allowing the resulting mixture to react at a temperature ranging from about 80° C. to about 100° C.

The added first monomers may be different compounds containing an isocyanate group, and these first monomers may be each independently mixed in different processes, thereby forming a prepolymer. For example, in the first mixing process, the first monomer included in the dissolved polyol and dispersant may be diphenyl diisocyanate, and the first monomer further added in the second mixing process may be isophorone diisocyanate. However, the present disclosure is not limited to the above examples.

In the formation of the prepolymer (operation S100), the mixing of the dissolved polyol and dispersant with the first monomer is an exothermic reaction, and a high-temperature reaction may be disadvantageous in view of chemical equilibrium. However, in the method of preparing a polyurea resin composition, according to an embodiment, although the mixing of the dissolved polyol and dispersant with the first monomer in the formation of the prepolymer is an exothermic reaction, the mixed materials are allowed to react at a relatively high temperature, and then may be cooled to a low temperature to perform an additional reaction. That is, in the formation of the prepolymer, the process of mixing with the first monomer containing an isocyanate group may be performed by two processes: a first mixing process of performing mixing at a relatively high temperature and a second mixing process of performing mixing at a relatively low temperature.

In an exemplary embodiment, the first mixing process may be performed at a temperature ranging from about 100° C. to about 120° C., and the second mixing process may be performed at a temperature ranging from about 80° C. to about 100° C. However, the present disclosure is not limited to the above examples.

The polyurea resin composition prepared by the above-described processes may have water solubility due to the prepolymer including the added dispersant and the first monomer, which is hydrophilic. In this case, when an industrial glove is coated with the polyurea resin composition, a part of the polyurea resin composition forms a coating layer, and a part thereof permeates into an inner skin of the industrial glove to form an inner film layer, and accordingly, adhesion between the layers and the fiber tissue of the industrial glove may be enhanced. This will be described in further detail below.

Next, the prepolymer is mixed with about 2 parts by weight to about 4 parts by weight of a second monomer containing an amine group to form a first composition (operation S200).

The second monomer containing an amine group may form a first composition by reacting with the prepolymer. The first composition may be understood as a composition formed by polymerization of some monomers before forming a final polyurea resin composition. In other words, the first composition may include a composition polymerized by a partial reaction between the prepolymer and the second monomer.

The second monomer may contain an amine group, thereby leading to polymerization with the isocyanate group of the prepolymer. The isocyanate group of the first monomer included in the prepolymer may react with the amine group of the second monomer, thereby forming a urea group.

In an exemplary embodiment, the second monomer containing an amine group may be piperazine or triethanolamine (TEA), but the present disclosure is not limited thereto.

In addition, the second monomer may neutralize the acidity of the dispersant included in the prepolymer, for example, dimethylolpropionic acid, in the above-described process. The second monomer includes an amine group having basicity, and thus may neutralize the acidity of the dispersant, thereby controlling the pH of the prepared polyurea resin composition.

In an exemplary embodiment, in formation of the first composition (operation S200), the second monomer containing an amine group may be mixed in an amount of about 2 parts by weight to about 4 parts by weight, about 2.5 parts by weight to about 3.5 parts by weight, or 3 parts by weight. In addition, the formation of the first composition may be performed at a temperature ranging from about 60° C. to about 80° C. However, the present disclosure is not limited thereto. In a subsequent process, the first composition may be further mixed with a different type of second monomer, thereby forming a second composition.

Next, the first composition is stirred and emulsified with about 100 parts by weight to about 200 parts by weight of a solvent (operation S300).

As the first composition and the solvent are stirred and emulsified, the first composition may be uniformly dispersed in the solvent. Accordingly, the prepared polyurea resin composition forms relatively small particles and has water solubility, and thus, when an industrial glove is coated therewith, the polyurea resin composition may partially permeate into an inner skin of the industrial glove, thereby forming an inner film layer. In a case in which the first composition and the solvent are stirred, when the amount of the solvent is insufficient, the first composition may not be uniformly dispersed. In this case, when an industrial glove is coated with such a polyurea resin composition, the polyurea resin composition may exhibit poor permeability, and thus adhesion of the formed coating layer to the glove may deteriorate.

In an exemplary embodiment, the solvent may be water (H$_2$O), and the first composition and the solvent may be stirred at about 1,200 rpm to about 1,900 rpm for about 30 minutes to about 60 minutes. However, the present disclosure is not limited thereto.

Lastly, about 0.2 part by weight to about 1.5 parts by weight of the second monomer may be further added to the emulsified first composition and stirred therein to form a second composition (operation S400).

In the present process, the second composition may be formed by mixing the emulsified first composition with the second monomer, thereby preparing a polyurea resin composition. The second composition may be formed by a reaction between the first composition and the second monomer, and the polyurea resin composition prepared thereby may have coating film formability.

A chain length of a polyurea resin included in the prepared polyurea resin composition may be adjusted according to an amount of the second monomer added to the second composition. In a case in which the second monomer is added in an amount greater than the above-described range, when an industrial glove is coated with the prepared polyurea resin composition, the polyurea resin composition is not able to permeate into the fiber tissue of the industrial glove, and thus the formed coating film layer may peel off of the glove due to poor adhesion thereof to the glove.

In contrast, in a case in which the second monomer is added in an amount less than the above-described range, when an industrial glove is coated with the prepared polyurea resin composition, an excess amount of the polyurea resin composition may permeate into fiber tissue of the glove so that the composition may permeate into an inner surface of the glove. In other words, the percentage of permeability and coating film formability of the prepared polyurea resin composition may be determined according to the amount of the second monomer. Thus, the second monomer needs to be added in an amount within the above-described range.

Meanwhile, in an exemplary embodiment, the second monomer mixed in the formation of the first composition (operation S200) may be triethanolamine (TEA), and the second monomer added in formation of the second composition (operation S400) may be piperazine. As described above, when the second composition is formed, the chain length of the polyurea resin may be adjusted according to the amount of the second monomer, and if needed, a molecular weight of the polyurea resin may be increased. In this case, the second composition may be formed by adding a second monomer that is different from the second monomer mixed in the formation of the first composition. However, the present disclosure is not limited to the above example.

In addition, in some embodiments, the formation of the second composition (operation S400) may include mixing the emulsified first composition and the second monomer at a temperature ranging from about 20° C. to about 50° C., and adding about 100 parts by weight to about 300 parts by weight of a solvent to the mixed first composition, and stirring the resulting composition at about 1,000 rpm to about 1,500 rpm.

The solvent may be water (H$_2$O), and the second composition may be in a form dispersed in a solvent. When stirring is performed using a sufficient amount of the solvent, the finally prepared polyurea resin composition may form a soft and robust coating layer.

According to one embodiment, the polyurea resin composition may include about 15 parts by weight to about 17.5 parts by weight of the polyol, about 0.5 part by weight to about 1.5 parts by weight of the dispersant, about 4.5 parts by weight to about 6.5 parts by weight of the first monomer, about 1 part by weight to about 2 parts by weight of the second monomer, and about 70 parts by weight to about 80 parts by weight of the solvent.

In an exemplary embodiment, the polyurea resin composition may include 16.5 parts by weight of the polyol, 1.1 parts by weight of DMPA, 5.9 parts by weight of methylene diphenyl diisocyanate and isophorone diisocyanate, 1.4 parts by weight of piperazine, and 75 parts by weight of water. However, the present disclosure is not limited to the above example.

When an industrial glove is coated with the polyurea resin composition prepared by the above-described method, the polyurea resin composition partially permeates into fiber tissue thereof, but does not permeate into an inner surface of the glove, thereby forming an inner film layer, and a thin coating layer may be formed on an outer surface of the glove. Accordingly, when coating an industrial glove, the polyurea resin composition does not permeate into an inner surface of the glove, and thus the glove may be easily separated from a mold in a manufacturing process, and a coating layer formed on an outer skin of the glove may have excellent durability.

Figure 2:
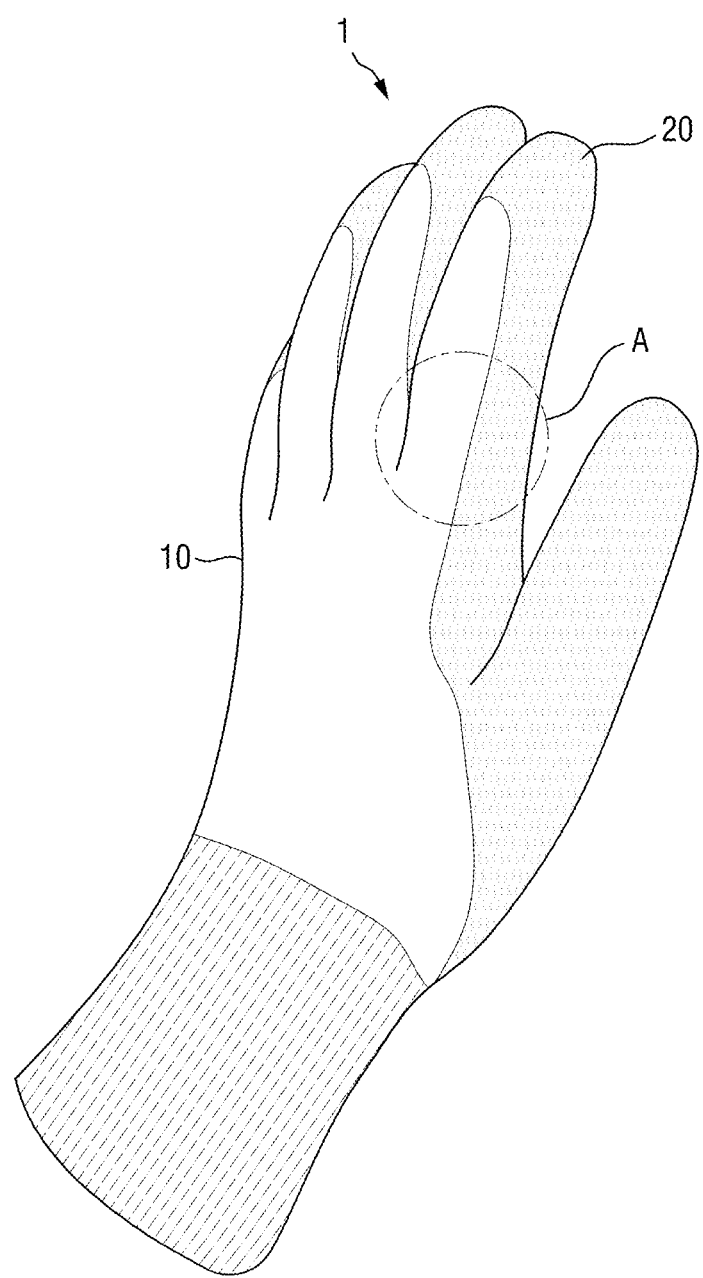
FIG. 2 is a schematic view illustrating a glove coated with a polyurea resin composition according to an embodiment.

FIG. 2 is a schematic view illustrating an industrial glove 1 coated with a polyurea resin composition, according to an embodiment.

Referring to FIG. 2, the industrial glove 1 according to an embodiment may include a glove 10 and a coating film layer 20 disposed on the glove 10 and including the polyurea resin composition prepared according to the above-described method. As described above, the polyurea resin composition prepared by the preparation method according to an embodiment may form the coating film layer 20 on the glove 10 such that the polyurea resin composition partially permeates into fiber tissue of the glove 10, but does not permeate into an inner surface thereof. Accordingly, adhesion between the coating film layer 20 formed on the glove 10 and the glove 10 may be enhanced. In addition, the remainder of the polyurea resin composition may form the coating film layer 20 on an outer skin of the glove 10, thereby enhancing the durability of the industrial glove 10.

According to one embodiment, the coating film layer 20 may include an inner film layer 22 formed such that at least a part of the polyurea resin composition partially permeates into an inner skin of the glove 10, but does not permeate into an inner surface of the glove 10, and a coating layer 21 formed, on an outer surface of the glove 10, of the remainder of the polyurea resin composition.

Figure 3:
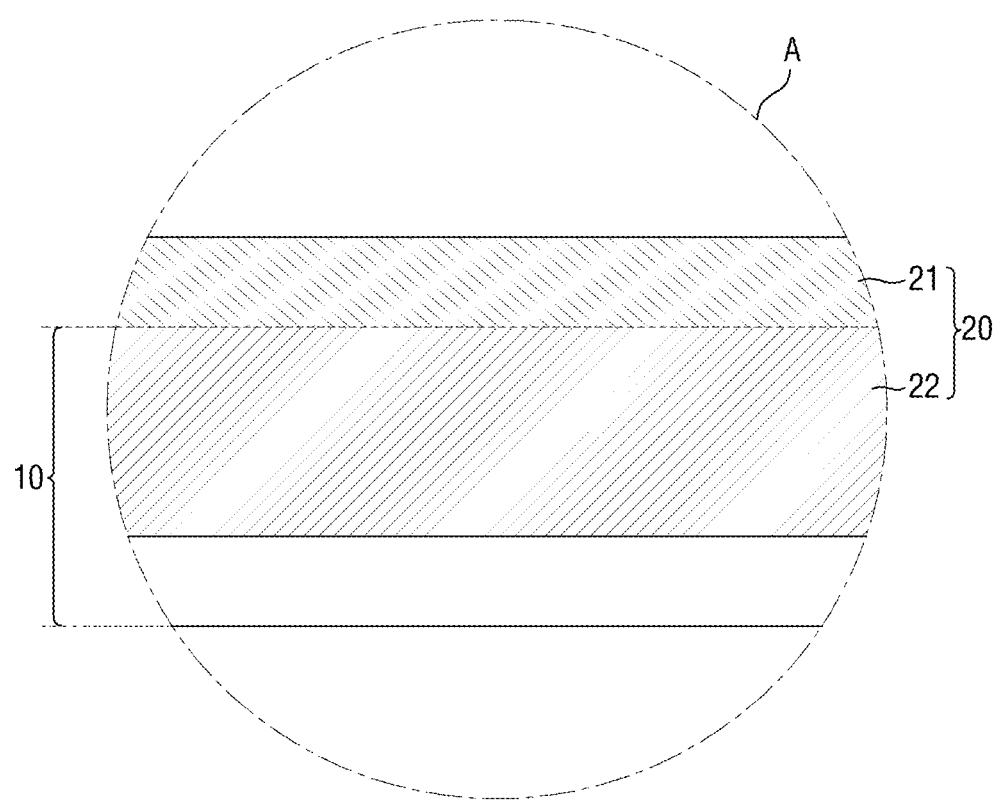
FIG. 3 is an enlarged cross-sectional view of portion A of FIG. 2.

FIG. 3 is an enlarged cross-sectional view of portion A of FIG. 2.

Referring to FIG. 3, the coating film layer 20 may include the coating layer 21 and the inner film layer 22.

The process of forming the coating film layer 20 on the glove 10 may be performed by dipping the glove 10 in a container containing the polyurea resin composition. In this regard, the polyurea resin composition may partially permeate into an inner fiber skin of the glove 10 to form the inner film layer 22, and the remainder thereof may remain on the outer surface of the glove 10 to form the coating layer 21.

As described above, the polyurea resin composition according to an embodiment may be present in a form in which a water-soluble polyurea resin is dispersed in a solvent. When the glove 10 is dipped in the polyurea resin composition, the inner fiber skin of the glove 10 may be impregnated with the polyurea resin dispersed in the solvent. However, the polyurea resin composition has a density not allowing the composition to permeate into the inner surface of the glove 10. Accordingly, when a user wears the industrial glove 1, a sense of a foreign body in the inner surface of the glove 1 may be minimized, and adhesion between the coating film layer 20 and the glove 10 may also be enhanced.

The remainder of the polyurea resin composition, which remains after forming the inner film layer 22, may form the coating layer 21 on the outer surface of the glove 10. As described above, in the polyurea resin composition, the chain length of the polyurea resin may be controlled by the second monomer. The polyurea resin composition that does not permeate into the inner surface of the glove 10 and remains on the outer surface of the glove 10 may form the coating layer 21, and thus durability of the industrial glove 1 may be enhanced. A detailed description of the coating film layer 20 formed in the industrial glove 1 will be provided below with reference to experimental examples.

Hereinafter, examples and experimental examples of the present disclosure will be described to aid in understanding the present disclosure. However, these examples and experimental examples are provided only for illustrative purposes, and examples and experimental examples of the present disclosure are not intended to be limited thereby.

EXAMPLES

Preparation Example 1. Preparation of Polyurea Resin Composition

<Formation of Prepolymer>

First, 70 kg of polypropylene glycol as a polyol was put into a fully-dried reactor, and the reactor was heated up to 90° C. Then, 5 kg of DMPA as a dispersant was added to the polyol and heated such that the temperature of the mixed raw materials reached 90° C. The heating process was performed for about 30 minutes until DMPA was completely dissolved in the polyol. Thereafter, the resulting solution was mixed with 13 kg of MDI as a first monomer, and the mixed raw materials were heated up to about 110° C. and allowed to react for about 30 minutes. Then, 10 kg of IPDI as a first monomer different from the MDI was added to the reaction product, and allowed to react at 80° C. to 100° C. for about 60 minutes, thereby forming a prepolymer.

<Formation of First Composition>

3 kg of triethanolamine (TEA) as a second monomer was added to the prepolymer, and allowed to react at 70° C. for about 20 minutes to form a first composition.

<Emulsification of First Composition>

100 kg of water was added to the formed first composition within about 1 minute, followed by stirring at 1,200 rpm to 1,900 rpm to be emulsified. The stirring process was performed for about 30 minutes to about 60 minutes.

<Formation of Second Composition-Preparation of Polyurea Resin Composition>

Lastly, piperazine as a second monomer was added to the emulsified first composition. In this regard, 1 kg of piperazine was dissolved in 20 kg of water at 60° C., and then the resulting solution was slowly added to the emulsified first composition, wherein the mixed composition was maintained at about 30° C. At this time, 200 kg of water was additionally added to reduce the viscosity of the composition, induce a polymerization reaction, and increase the molecular weight of a polymer. The first composition and the piperazine were mixed while being stirred at 1,000 rpm to 1,500 rpm, and the polymerization of a polyurea resin was performed for about 60 minutes. The resulting second composition was further stirred at 500 rpm to 800 rpm for 30 minutes to be emulsified.

The polyurea resin composition prepared according to the above-described method is hereinafter referred to as Preparation Example 1. The polyurea resin composition of Preparation Example 1 included 75 parts by weight of water, 16.5 parts by weight of the polyol, 5.9 parts by weight of the first monomer, 1.4 parts by weight of the second monomer, and 1.1 parts by weight of the dispersant.

Preparation Example 2

A polyurea resin composition was prepared in the same manner as in Preparation Example 1, except that the process of mixing with MDI as a first monomer and heating the resulting mixture was performed at 90° C. The polyurea resin composition prepared according to the above-described method is hereinafter referred to as Preparation Example 2

Preparation Example 3

A polyurea resin composition was prepared in the same manner as in Preparation Example 1, except that the process of mixing with MDI as a first monomer and heating the resulting mixture was performed at 120° C. for 80 minutes, and 2 kg of piperazine as a second monomer was mixed. The polyurea resin composition prepared according to the above-described method is hereinafter referred to as Preparation Example 3.

Preparation Example 4

A polyurea resin composition was prepared in the same manner as in Preparation Example 1, except that after mixing with MDI as a first monomer and heating the resulting mixture, 5 kg of polylink having a slow reaction rate was further mixed therewith and allowed to react for 5 minutes to 10 minutes. The polyurea resin composition prepared according to the above-described method is hereinafter referred to as Preparation Example 4.

[Table 1] summarizes components and preparation conditions of the polyurea resin compositions of Preparation Examples 1 to 4.

|  | Preparation Example 1 | Preparation Example 2 | Preparation Example 3 | Preparation Example 4 |
| --- | --- | --- | --- | --- |
| Polyol | 70 kg | 70 kg | 70 kg | 70 kg |
| Dispersant | DMPA 5 kg | DMPA 5 kg | DMPA 5 kg | DMPA 5 kg |
| First monomer | MDI 13 kg | MDI 13 kg | MDI 13 kg | MDI 13 kg Polylink 5 kg |
|  | 110° C., 30 min | 90° C., 30 min | 120° C., 80 min | 110° C., 30 min |
|  | IPDI 10 kg | IPDI 10 kg | IPDI 10 kg | IPDI 10 kg |
|  | 80° C. to 100° C., | 80° C. to 100° C., | 80° C. to 100° C., | 80° C. to 100° C., |

-continued

|  | Preparation Example 1 | Preparation Example 2 | Preparation Example 3 | Preparation Example 4 |
| --- | --- | --- | --- | --- |
| Second monomer | 60 min Triethanolamine 3 kg Piperazine 1 kg | 60 min Triethanolamine 3 kg Piperazine 1 kg | 60 min Triethanolamine 3 kg Piperazine 2 kg | 60 min Triethanolamine 3 kg Piperazine 1 kg |

Experimental Example 1. Evaluation of Coating Film Formation of Prepared Polyurea Resin Composition A glove for forming a coating film was coated with each of the polyurea resin compositions of Preparation Examples 1 to 4, and it was evaluated whether or not the polyurea resin composition formed a coating film on the glove. In particular, the gloves coated with the polyurea resin compositions of Preparation Examples 1 to 3 are illustrated in FIGS. 4 to 6, respectively.

Figure 4A:
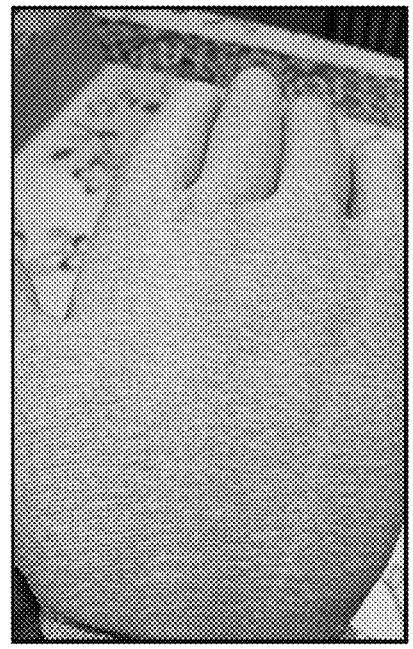
FIGS. 4A, 4B, 5 and 6 are images showing gloves coated with polyurea resin compositions according to an experimental example and a comparative example.
Figure 4B:
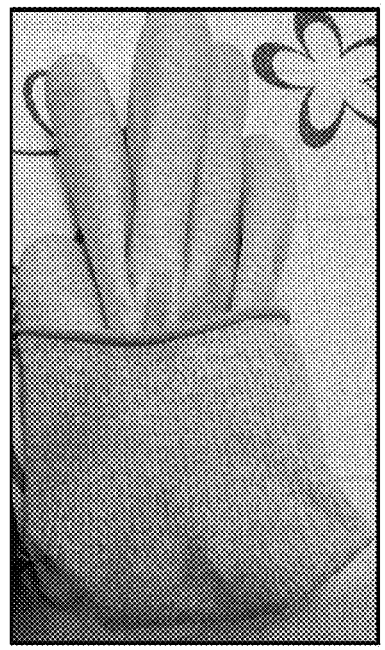
Figure 5:
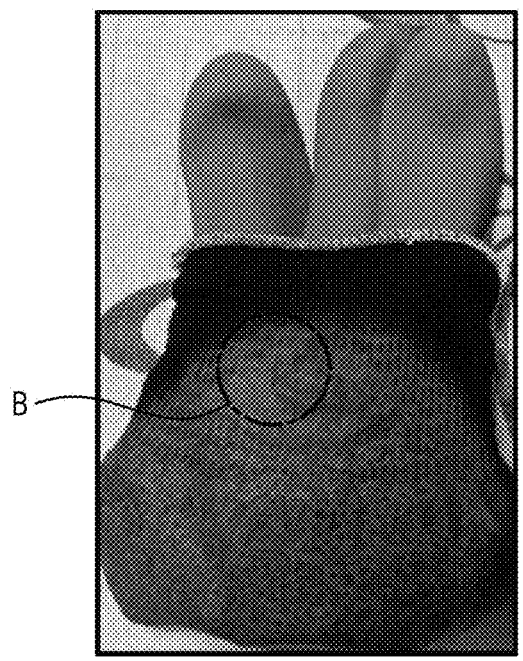
Figure 6:
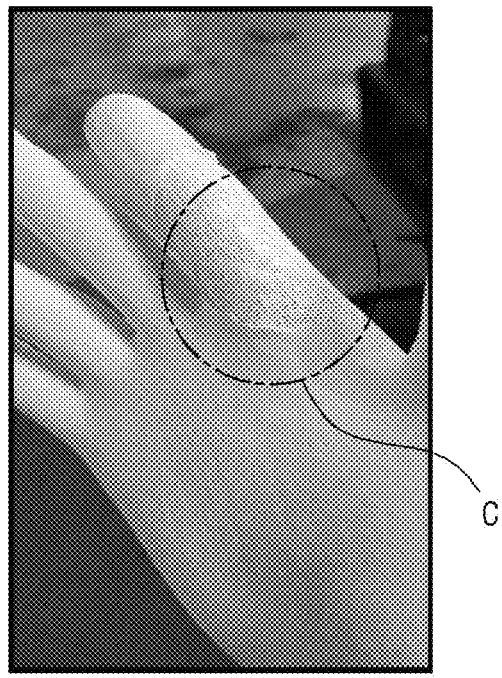

FIGS. 4 to 6 are images showing gloves coated with the polyurea resin compositions according to Preparation Examples 1 to 3.

FIG. 4A is an image showing an outer surface of the glove coated with the polyurea resin composition of Preparation Example 1, and FIG. 4B is an image showing an inner surface of the glove.

Referring to FIG. 4A, it can be seen that, in the case of the glove coated with the polyurea resin composition of Preparation Example 1, the polyurea resin composition forms a coating layer with a uniform thickness on an outer surface of the glove. Since the polyurea resin composition forms the coating layer on the glove, the glove may have a good surface state.

In addition, referring to FIG. 4B, it can be seen that, in the glove coated with the polyurea resin composition of Preparation Example 1, the polyurea resin composition does not permeate into an inner surface of the glove. This means that the polyurea resin composition permeates into the fiber tissue of the glove to be coagulated therein, and does not permeate up to an inner surface of the glove. Accordingly, in the glove coated with the polyurea resin composition of Preparation Example 1, the resin composition does not permeate into the inner surface of the glove, and thus may not be in direct contact with the skin of a wearer and may have enhanced adhesion with the glove. In addition, when manufacturing industrial gloves, gloves coated with the resin composition may be easily separated from a mold and may be suitably mass-produced.

In contrast, referring to FIG. 5, it can be seen that, in the case of a glove coated with the polyurea resin composition of Preparation Example 2, the resin composition permeates into an inner fiber skin of the glove. In FIG. 5, B denotes the occurrence of a pin hole, which is a mark formed by the polyurea resin composition of Preparation Example 2 permeating into an inner surface of the glove.

In this case, although adhesion between the coating layer formed of the resin composition and the fiber is excellent, the resin composition may permeate into the inner surface of the glove, and thus can be seen from the outside. Accordingly, the resin composition permeating into the inner skin may be in direct contact with the skin of a wearer, thus causing discomfort. In addition, the industrial glove has a non-uniform surface, and when manufacturing an industrial glove, the resin permeating into the glove may stick to a mold, thus somewhat reducing productivity.

In addition, referring to FIG. 6, it can be seen that, in the case of the glove coated with the polyurea resin composition of Preparation Example 3, the polyurea resin composition is unable to permeate into an inner fiber skin of the glove and forms only a coating layer on an outer surface of the glove. Accordingly, although an excellent coating layer may be formed on the outer skin of the industrial glove, the coating layer may be easily peeled off from the glove due to very weak adhesion thereof.

Although not shown in the drawings, in the case of a glove coated with the polyurea resin composition of Preparation Example 4, as the polyurea resin composition was dried, the formed coating film became hard and exhibited significantly reduced elasticity. Accordingly, although a soft gripping sense was not obtained, the resin composition had increased hardness and enhanced abrasion resistance, and thus when this glove was used in a working environment requiring contact with a rough substance, effective performance could be exhibited.

Experimental Example 2. Evaluation of Durability and Coating Film Formability of Glove Coated with Polyurea Resin Composition (1)

The viscosity of the polyurea resin composition of Preparation Example 1 was measured at a temperature of 20° C. The measured viscosity was 300 cps or more, and a glove was dipped in the composition of the present experimental example and wearability of the glove was evaluated.

As a result, the thickness of the coating film formed of the polyurea resin composition on an outer skin of the glove was increased, and flexibility of the glove when worn was decreased, and thus a wearer felt discomfort. In addition, the glove coated with the resin composition according to the present experimental example was subjected to an abrasion resistance test among tests associated with EN388, which is a European certification standard. As a result, it was confirmed that, when a durability test was repeated 5,000 times to 6,000 times, a coating film formed of the resin composition was damaged.

Experimental Example 3. Evaluation of Durability and Coating Film Formability of Glove Coated with Polyurea Resin Composition (2)

The viscosity of the polyurea resin composition of Preparation Example 1 was measured at a temperature of 40° C. The measured viscosity was between 100 cps and 180 cps, and a glove was dipped in the composition of the present experimental example and wearability of the glove was evaluated.

As a result, as compared to Experimental Example 2, the thickness of the coating film formed of the polyurea resin composition on an outer skin of the glove was decreased, and flexibility of the glove in a worn state was relatively excellent, and thus a wearer could not feel discomfort. In addition, a durability test was performed on the glove coated with the resin composition according to the present experimental example in the same manner as in Experimental Example 2. As a result, it was confirmed that, when the durability test was repeated 5,000 times to 6,000 times, the coating film formed of the resin composition was damaged.

Experimental Example 4. Evaluation of Durability and Coating Film Formability of Glove Coated with Polyurea Resin Composition (3)

10 parts by weight of water was further added to the polyurea resin composition of Preparation Example 1, a glove was dipped in the resin composition at a temperature of 40° C., and wearability of the glove was evaluated.

As a result, as compared to Experimental Example 3, it was confirmed that the thickness of a coating film formed of the polyurea resin composition on an outer skin of the glove was further decreased. In addition, a durability test was performed on the glove coated with the resin composition according to the present experimental example in the same manner as in Experimental Example 2. As a result, it was confirmed that, when the durability test was repeated 2,000 times to 3,000 times, the coating film formed of the resin composition was damaged.

In summary, referring to Experimental Examples 2 to 4, it was confirmed that the polyurea resin composition provided the most suitable coating film thickness at about 40° C. and had excellent durability and excellent wearability.

As is apparent from the foregoing description, a method of preparing a polyurea resin composition, according to an embodiment of the present disclosure, includes forming a prepolymer at different temperatures, and is performed by adding a monomer containing an amine group according to two separate processes, and thus the prepared polyurea resin composition can have adhesion to a target object according to permeation thereinto and can also have coating film formability.

Although embodiments of the present disclosure have been described with reference to the accompanying drawings, the present disclosure is not limited to the embodiments and may be embodied in many different forms, and it will be understood by one of ordinary skill in the art to which the present disclosure pertains that the invention may be embodied in various particular forms without departing from the technical spirit or essential characteristics thereof. Thus, the embodiments described herein should be considered in an illustrative sense only and not for the purpose of limitation.

The invention claimed is:

1. A method of preparing a polyurea resin composition, the method comprising:
    forming a prepolymer by mixing a polyol, a dispersant, and a first monomer containing an isocyanate group;
    forming a first composition by mixing the prepolymer with a second monomer containing an amine group;
    stirring and emulsifying the first composition with a solvent; and
    forming a second composition by further adding the second monomer to the emulsified first composition and stirring the resulting composition,
    wherein the forming of the prepolymer comprises:
        a first mixing process of dissolving the polyol and the dispersant at a temperature ranging from about 80° C. to about 95° C.;
        mixing the dissolved polyol and dispersant with the first monomer and heating the resulting mixture to a temperature ranging from about 100° C. to about 120° C.; and
        a second mixing process of further adding the first monomer to the heated mixture and allowing the resulting mixture to react at a temperature ranging from about 80° C. to about 100° C.

2. The method of claim 1, wherein the dispersant comprises dimethylolpropionic acid (DMPA), the first monomer comprises methylene diphenyl diisocyanate (MDI) or isophorone diisocyanate (IPDI), and the second monomer comprises triethanolamine (TEA) or piperazine.

3. The method of claim 1, wherein the first monomer mixed in the heating comprises methylene diphenyl diisocyanate (MDI), and the first monomer mixed in the second mixing process comprises isophorone diisocyanate (IPDI).

4. The method of claim 1, wherein the second monomer mixed in the forming of the first composition comprises triethanolamine (TEA), and the second monomer mixed in the forming of the second composition comprises piperazine.

5. The method of claim 1, wherein, in the emulsifying of the first composition, the solvent comprises water, and the first composition and the solvent are stirred at about 1,200 rpm to about 1,900 rpm for about 30 minutes to about 60 minutes.

6. The method of claim 1, wherein the forming of the first composition is performed at a temperature ranging from about 60° C. to about 80° C.

7. The method of claim 1, wherein the forming of the second composition comprises:
    mixing the emulsified first composition and the second monomer at a temperature ranging from about 20° C. to about 50° C.; and
    stirring the mixed first composition and second monomer with an additional solvent at about 1,000 rpm to about 1,500 rpm.

8. The method of claim 1, further comprising emulsifying the second composition while being stirred at about 500 rpm to about 800 rpm.

9. A polyurea resin composition prepared by the method of claim 1, wherein the second monomer mixed in the forming of the first composition comprises triethanolamine (TEA), and the second monomer mixed in the forming of the second composition comprises piperazine.

10. An industrial glove comprising:
    a glove; and
    a coating film layer disposed on the glove and comprising a polyurea resin composition prepared by;
        forming a prepolymer by mixing a polyol, a dispersant, and a first monomer containing an isocyanate group;
        forming a first composition by mixing the prepolymer with a second monomer containing an amine group;
        stirring and emulsifying the first composition with a solvent; and
        forming a second composition by further adding the second monomer to the emulsified first composition and stirring the resulting composition, wherein the second monomer mixed in the forming of the first composition comprises triethanolamine (TEA), and the second monomer mixed in the forming of the second composition comprises piperazine.

11. The industrial glove of claim 10, wherein the coating film layer comprises:
    an inner film layer formed such that at least a part of the polyurea resin composition partially permeates into an inner skin of the glove, but does not permeate into an inner surface of the glove; and a coating layer disposed on an outer surface of the glove, the coating layer being formed of the remainder of the polyurea resin composition.

\* \* \* \* \*